United States Patent [19]

Allcock et al.

[11] 4,242,499

[45] Dec. 30, 1980

[54] COLORED POLYMERS COMPRISING POLY(ORGANOPHOSPHAZENES) WITH CHROMOPHORES AS SUBSTITUENT GROUPS

[75] Inventors: Harry R. Allcock, State College, Pa.; Karen M. Kosydar, Stanford, Calif.; Sarah D. Wright, Hershey, Pa.

[73] Assignee: The Firestone Tire & Rubber Company, Akron, Ohio

[21] Appl. No.: 61,410

[22] Filed: Jul. 27, 1979

Related U.S. Application Data

[63] Continuation-in-part of Ser. No. 944,572, Sep. 21, 1978, abandoned, which is a continuation of Ser. No. 796,073, May 12, 1977, abandoned.

[51] Int. Cl.$^3$ ............... C08G 79/02; C07C 46/00; C07C 57/00

[52] U.S. Cl. ................................ 528/399; 8/506; 260/144; 260/314.5; 260/321; 260/367; 260/389; 544/73; 546/22; 568/704

[58] Field of Search ............ 260/144, 551 P, 606.5 P; 528/399; 8/4

[56] References Cited

U.S. PATENT DOCUMENTS

| | | | |
|---|---|---|---|
| 3,182,028 | 5/1965 | Herring | 260/2 |
| 3,197,296 | 7/1965 | Drake et al. | 260/144 X |
| 3,446,876 | 5/1969 | Breslow | 260/927 |
| 3,563,918 | 2/1971 | Murch et al. | 260/2 |
| 4,018,822 | 4/1977 | Sharma et al. | 260/551 P |

*Primary Examiner*—John Doll

[57] ABSTRACT

Poly(organophosphazenes) with chromphoric substituents and method of preparation. Products are useful to add color to polyphosphazene polymers to produce food colorants, colored films, colored fibers and similar products.

18 Claims, No Drawings

COLORED POLYMERS COMPRISING POLY(ORGANOPHOSPHAZENES) WITH CHROMOPHORES AS SUBSTITUENT GROUPS

RELATED APPLICATIONS

This application is a continuation-in-part of application Ser. No. 944,572 filed Sept. 21, 1978, which is, in turn, a continuation application of application Ser. No. 796,073 filed May 12, 1977, both now abandoned.

BACKGROUND OF THE INVENTION

This invention is concerned with novel poly(organophosphazenes) characterized by the presence of chromophoric groups. These groups may be covalently bound to the phosphazene polymers; or, if the chromophores are sufficiently acidic they may be ionically bound to the polymer so as to form acid addition salts. The polymers of the invention are useful for a wide variety of purposes where it is desirable to add color to the known advantageous chemical and physical properties of polyphosphazenes. They may be used therefore as colored films, fibers, food colorants and for a large number of other purposes.

THE INVENTION

The products of this invention may be represented by the formulas:

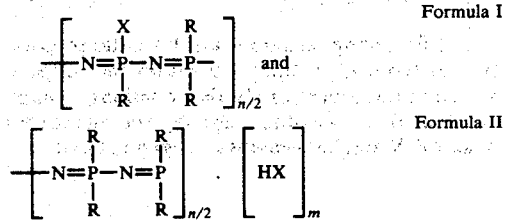

wherein X is a chromophoric group derived from a dye molecule, R is an organo substituent, n is an integer of from about 250 to 20,000, and m is an integer no larger than n/2 in a specific compound.

It will be seen that in Formula I the chromophore is covalently bound to the polymer backbone, and in Formula II it is electrovalently bound. Formula II, in fact, represents an acid addition salt.

The formulas illustrate compounds in which the ratio of chromophore groups to organo groups is 1:3 or 1:4. The ratio may be as high as 1:1 for the preparation of highly colored products. However, if the number of chromophoric groups becomes too large, it may adversely affect the desirable properties of the polymer. The ratio may be as low as 1:15,000 for the production of slightly tinted products such as filters. In the acid addition salts of Formula II, some of the organo groups may be replaced with chromphore groups.

Any of a large number of organo substituents are possible in the polymers and copolymers of this invention. These include, for example, aryloxy groups containing up to ten carbon atoms such as substituted or unsubstituted phenoxy and naphthoxy groups. The substituent, of course, must be reaction inert. Typical substituents include alkyl groups or alkoxy containing up to five carbon atoms, phenoxy, halo, cyano, nitro, carboxyalkyl and thioalkyl groups. Other possible organo substituents include aralkoxy containing up to fifteen carbon atoms represented by the formula:

$$Ar(CH_2)_nO-$$

wherein Ar is phenyl or naphthyl and n is an integer selected so that the total number of carbon atoms in the aryl ring and the side chain is not more than ten. The phenyl and naphthyl groups may be unsubstituted, or substituted with reaction inert groups such as those described above.

Still other possible organo substituents are alkoxy, alkenyloxy and alkynyloxy, both straight and branched chain, containing up to seven carbon atoms. The groups may be substituted as described above. Typical substituents may be derived from 1-hydroxy-propyne-2; 2-hydroxy-pentene-3; 1-hydroxy-heptane; 1-hydroxy-3,4-dichloro-butane; or trifluoroethanol; 2,2,3,3,3-pentafluoropropanol; 2,2,3,3,4,4-heptafluorobutanol; 2,2,3,3-tetrafluoropropanol; 2,2,3,3,4,4,5,5-octafluoropentanol; 2,2,3,3,4,4,5,5,6,6,7,7-dodecafluoroheptanol; and others of the formula $z(CF_2)_nCH_2OH$ in which z is hydrogen or fluorine and n is an integer from one to ten.

Cycloalkoxy and cycloalkenyloxy substituents are also possible. These include, for example, substituents derived from cyclopentanol, cyclohexanol, 1-decahydronaphthol, 2-decahydronaphthol, 1-hydroxy-cyclohexene-3, and 1-hydroxy-5-nitro-cyclohexene-2.

The above substituents are all derived from hydroxyl substituted radicals. Additional substituents may be derived from amines which have at least one active hydrogen attached to the amine group, i.e. primary or secondary amines. These include, for example, alkyl, cycloalkyl, aryl, diaryl, alkaryl, dialkaryl, aralkyl, diaralkyl, alkenyl, dialkenyl, aralkenyl, or diaralkenyl; the alkyl, aryl, and alkenyl groups being defined as above. The groups may be substituted with reaction inert substituents as described above.

Typically, an amine derived substituent may be from methylamine, ethylamine, dimethylamine, ethylmethylamine, aniline, methylaniline, p-chloroaniline, m-ethoxyaniline and toluidine.

Organo groups may also be derived from mercapto substituted compounds including the mercaptan compounds described in U.S. Pat. No. 3,974,242 (hereby incorporated by reference). Representative and suitable mercaptan compounds, as described in the aforementioned patent, are alkyl mercaptans, which may contain up to six carbon atoms; arylmercapto such as thiophenols and thionaphthols; and alkarylmercapto such as benzyl mercapton; cycloalkylmercapto such as cyclohexyl mercaptan and the like.

It is not essential that all the organo groups be identical. A polyphosphazine polymer may be substituted with two or more different organo substituents selected, for example, from the alkoxy, aryloxy, amino and mercapto groups described above to impart special properties to the final product.

Certain organo substituents are preferred, since the organo groups are selected to impart some desirable property to the final product, and to do so as economically as possible. Generally, organo substituents are selected to modify the solubility of the final product in selected solvents. This can be readily achieved by selecting a substituent or group of substituents with varying hydrophilic or hydrophobic characteristics. The most water soluble polymers can be produced by selecting a lower alkylamino substituent. Water resistance is imparted to the final product by utilizing a trifluoroethoxy group.

The preferred substituents in accordance with the above criteria are methoxy, ethoxy, propoxy, butoxy, isobutoxy, phenoxy, trifluoroethoxy, methylamino, ethylamino, propylamino, butylamino, phenylamino and piperidino.

Those skilled in the art will recognize that steric factors must be considered in selecting organo substituents. The substituion of a bulky substituent may inhibit the placement of another substituent. If the chromophore group is too large, it may not be possible to substitute a bulky organo substituent. These factors will present no difficulty to the skilled artisan.

Electropositive organo groups which supply electrons to the nitrogen atom of the polymer will enhance its basicity and help to stabilize the product. The preferred electron supplying groups are those which bind to the polymer through oxygen or nitrogen, and include, for example, methoxy, ethoxy, propoxy, butoxy, isobutoxy, methylamino, ethylamino, propylamino, butylamino, phenylamino, and piperidino.

As will be apparent to those skilled in the art, both acidic and basic chromophoric compounds can be used to produce compounds of Formula I by the choice of appropriate reactants and reaction conditions.

Polyphosphazenes are strongly basic. Therefore, compounds of Formula II are prepared by acid base reactions between the polymer and an acidic chromophoric compound. The latter compound may contain an hydroxyl group rendered strongly acidic due to the structure of the balance of the molecule, or it may contain a characteristically acid group such as a carboxyl or sulfonic group.

Quite clearly, the range of chromophoric groups which can be bound either covalently or electrovalently to the polymer substrate is enormous. These include chromophores from all of the usual classifications, including such dyes as azo, nitro, ketone amine, anthraquinone, acridine, triphenylmethane, oxazine, phthalocyanine, indigoid and sulfur.

A few specific dyes, mentioned by way of example only, which can be employed to prepare products of Formula I include: celliton yellow, celliton orange, golden yellow, golden orange I, celliton violet R, oil orange, para red, cellitazol ST, yellow AB, brown V, celliton fast yellow, martius yellow, auramine, sudan violet, sudan green, chrysaniline yellow, proflavin and fuchsine.

Specific dyes utilizable for the production of ionic compounds include, for example, amido naphthol brown, gallocyanine, chrysamine in the acid form, benzo fast yellow in acid form, direct orange, fast red, metanil yellow, victoria violet, biebrich scarlet, orange R and rhodamine B.

All of the specific dyes mentioned are illustrated by formula in The Chemistry of Synthetic Dyes and Pigments, H. A. Lubs, Reinhold, 1955. This publication, as does the Colour Index, lists a large number of other chromophoric compounds which can be used to prepare products of this invention. Those skilled in the art, from a consideration of the structures of the above named compounds coupled with the balance of this disclosure, especially the examples, will have no difficulty preparing hundreds of embodiments of this invention.

The following equations illustrate the preparation of typical types of compounds within the scope of Formula I of this invention. In the equations, Compounds I and II are known and prepared by known reactions, and X and R have the meanings assigned above.

EQUATION A

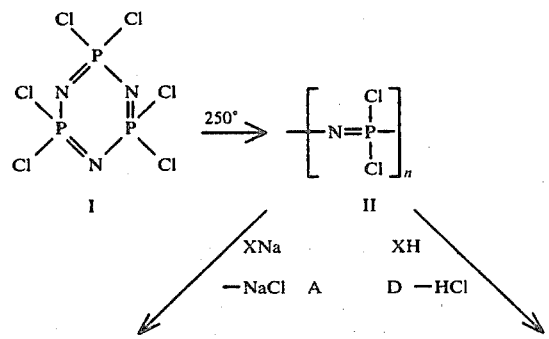

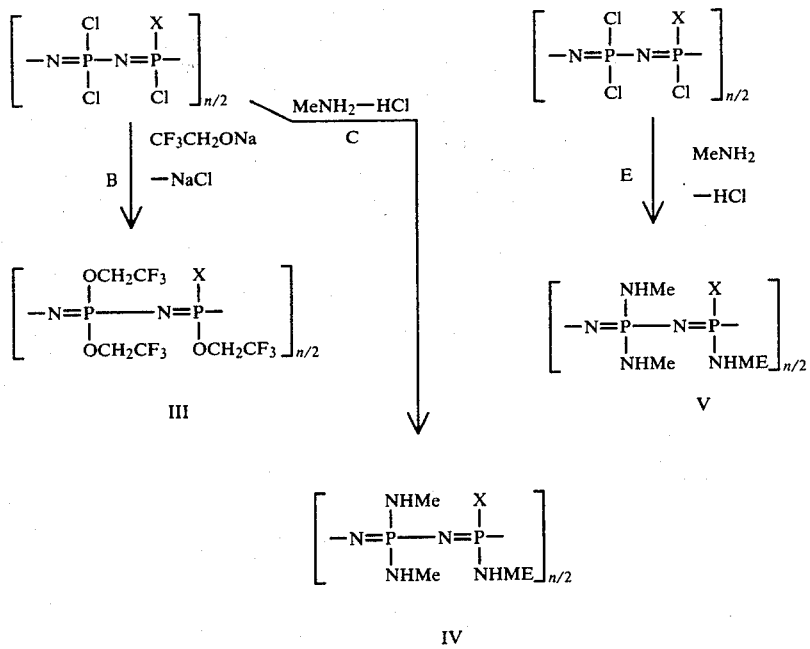

III

IV

V

Acid addition salts, as aforesaid are prepared by typical acid base reactions such as are illustrated by the following equations:

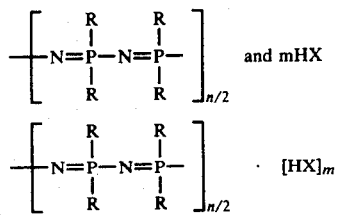

wherein X is a selected chromophoric group.

It will be noted from the above reactions that the molecular weight of the final polymers will depend upon the molecular weight of the original polyphosphazene reactant. The most useful compounds within the scope of this invention are those in which n is from about 250 to 10,000. Although polymers in which n is appreciably less than 250 can be usefully employed for many purposes, it is usual that n is not markedly higher than 20,000.

The molecular weight range for the compounds of this invention will vary somewhat with the polymer and chromophore, but is generally from about 100,000 to 4,000,000.

The products of this invention can be fabricated utilizing standard polymer processing techniques. Thus, for example, they can be cast as films from solution, they can be extruded or they can be molded. To utilize these techniques, it is best to avoid cross-linking during the formation of the polymer, since cross-linked polymers are generally too rigid to be readily processed. However, it is sometimes desirable to cross-link the product after it has been formed, for example by heating, as in the case with curing rubber and other polymers. Cross-linking increases the dimensional stability of the polymer.

One very useful technique for cross-linking is to prepare the polymers to contain a small number of ethyleneimino groups. Such molecules are readily cross-linked by heating at any time after formation. The cross-linking appears to take place by a free radical mechanism in which adjacent polymer chains are linked through tetramethylene groups. In polymers which are prepared for cross-linking, the number of ethyleneimino groups per repeating unit is generally from about 0.0001 to 0.2. Other cross-linking moieties and methods are set forth in U.S. Pat. Nos. 4,055,520; 4,061,606; 4,073,824; 4,073,825 and 4,076,658, all of which are hereby incorporated by reference and include $CH_2=CHO-$, and $CF_2=CFH-$.

As stated above, the compounds of this invention are useful for a wide variety of purposes. They may be formed into fibers, films, or numerous types of molded products.

A special advantage of the products is that they can be formed into food colorants which are not absorbed through the intestinal wall, and are fully and safely excreted. This is especially important with colorants which are suspected of metabolizing into toxic products when absorbed. These colorants may also be incorporated into color coded coatings for pills and other medicaments.

Products of this invention intended for use as food colorants will generally have alkoxy or aryloxy substituents so as to increase the resistance to hydrolytic decomposition. Normally, the selected product will be a Formula I type since many of the Formula II type products would be subject to displacement reactions with gastric acid.

Products selected for use as fibers will preferably have a glass transition temperature below 25° C., and a chain length greater than 1000 monomer residues. Since at least some degree of microcrystallinity is desirable in fiber forming polymers, the organo groups will all be identical to enhance molecular orientation.

For use in films for optical filters, for photographic emulsions and the like, the degree of microcrystallinity should be low to minimize opalescence. As with fibers, the chain length is generally above 1000 monomer units.

A reaction such as Reaction A in Equation A is normally conducted in a polar organic solvent in which the reactants are at least partially soluble under anhydrous conditions at a temperature of from $-30°$ C. to $175°$ C. It is preferred, but not essential, to conduct the reaction under an inert atmosphere, such as nitrogen.

Typically useful solvents include ethers containing up to eight carbon atoms, esters containing up to ten carbon atoms, and symmetrical or non-symmetrical ketones containing up to ten carbon atoms. Benzene and tetrahydrofuran are the preferred solvents.

Reaction time is usually from 10 to 600 minutes.

The molar quantity of chromophoric compounds employed for reaction will be selected on the basis of the desired ratio of organo to chromophore groups.

Reaction B may be effected without isolation of the intermediate chromophoric group substituted polymer by adding the fluoro substituted salt or other selected compound to the reaction mixture. Preferably, addition takes place over a period of from 0.25 to 3 hours while maintaining the temperature at from $-30°$ C. to $150°$ C.

At the end of the addition period, the reaction mixture is allowed to stand at a temperature of from $25°$ C. to $100°$ C. for from 3 to 10 hours to complete reaction.

Generally, the amount of trifluoro substituted compound or equivalent compound employed will be at least sufficient to replace the calculated number of chlorine atoms which remain on the polymer substrate based on the quantities of original polymer and chromophore reactants.

The final product may be recovered (and purified, if desired) in any convenient manner. Several procedures are illustrated in the examples.

Reactions C, D and E are all essentially similar. It is convenient to effect these reactions in the presence of a hydrogen chloride scavenger such as pyridine or triethylamine. The reactions take place under anhydrous conditions.

In the presently preferred procedure, reaction is carried out in a reaction inert solvent of the type described above. Any of a wide variety of solvents that will dissolve the polymeric starting material may be employed. These include, for example, aromatic hydrocarbon solvents such as benzene and toluene and cyclic ethers such as dioxane and tetrahydrofuran.

The time and temperature of the reaction will vary within very wide ranges, depending principally on the selected reactants. The temperature range may extend from $-32°$ C. to $35°$ C., or even higher, and the time from 2 to 48 hours.

A few simple observations will permit those skilled in the art readily to determine the optimum temperature and time of reaction for a particular set of reactants.

The various methods of isolation of the final product are illustrated in the examples. Normally, the procedure will vary with the solubility characteristics of the product. If it is soluble in the organic solvent in which it is prepared, it may be isolated by evaporation of the solvent or precipitation with a nonsolvent, after removing the insoluble salt formed from the scavenger by filtration. If both polymer and amine salt are insoluble in the organic reaction medium, but soluble in water, the amine salt can be removed by dialysis using water.

Acid addition salts such as are illustrated by Formula II are normally prepared in organic or aqueous solvents by mixing the selected reactants at a temperature of from $-90°$ C. to $150°$ C. The duration of the reaction is not critical, and will vary appreciably with the particular reactants, the temperature and the quantities employed. Some reactions will be essentially complete in as short a time as one minute. Others will give optimum results only after a reaction period of four or five hours.

Typically useful organic solvents include aromatic and aliphatic hydrocarbons, ketons and ethers, suitably acetone, benzene or tetrahydrofuran.

The following non-limiting examples are given by way of illustration only.

EXAMPLE 1

Poly[(1-phenylazonaphthalene-2-oxy-trifluoroethoxy) phosphazene]

The sodium salt of 1-phenylazo-2-hydroxynaphthalene is prepared with excess sodium hydride in tetrahydrofuran (THF) solution, initially under nitrogen atmosphere for 30 min. The color of the solution changes from red-orange to deep red as the salt forms.

A solution of sodium 1-phenylazonaphthalene-2-oxide (0.38 g, 0.0014 mol) in THF (250 ml) is filtered through a glass frit in a Schlenk-type additional funnel by a positive nitrogen pressure into a reaction vessel which contains a stirred solution of poly (dichlorophosphazene) (15.7 g, 0.14 mol) in THF (1400 ml) under dry nitrogen atmosphere. The addition takes place over 30 min. After 1 hr. of reaction, an etheric (250 ml) solution of sodium trifluoroethoxide (39.8 g, 0.33 mol) is added slowly during 2 hr. The color of the reaction mixture changes from orange-red, through brown, and then to orange during the 36 hr. reaction period at $25°$. The polymer is recovered by removal of the solvent at reduced pressure and precipitation into heptane. It is purified by precipitation twice from THF into distilled water and 7 times from THF into heptane or benzene (yield, 16.2 g, 51%; ratio of X:R is $1:4 \times 10^{-3}$.

The corresponding methoxy, ethoxy, butoxy, benzyloxy and phenoxy compounds are similarly prepared.

Analogous compounds of all of the above compounds are prepared by replacing the azo dye with celliton yellow, golden yellow and golden orange I.

EXAMPLE 2

Poly[(1-phenylazonaphthalene-2-oxy-methylamino) phosphazene]

A solution of sodium-1-phenylazonaphthalene-2-oxide (0.24 g, $1 \times 10^{-3}$ mol) in THF (200 ml) is pressure filtered under nitrogen into a stirred solution of poly(dichlorophosphazene) (11.2 g, 0.1 mol) in THF (700 ml). The total addition time is 35 min. After a further 90 min. of reaction time, the mixture is transferred to an addition funnel and added dropwise during 3 hr. to a stirred solution of methylamine (43 ml, 0.96 mol) in THF (500 ml) at $0°$ C. Atmospheric moisture is rigorously excluded. After an additional 42 hr. reaction period, solvent is removed at reduced pressure and the polymer isolated by precipitation into heptane. Purification is effected by dialysis in water for 48 hr., centrifugation for 30 min. at 10,000 r.p.m., and multiple precipitation from aqueous 95% ethanol into THF or heptane until no free dye is detected spectroscopically in the precipitation medium. Yield, 3.4 g, 30.4%; x :R, $1:1 \times 10^{-3}$. The polymer is orange in color. It forms hydroscopic, brittle films that were soluble in water, methanol, or ethanol, but only slightly soluble in isopropanol.

The corresponding ethylamino, propylamino, diethylamino, anilino, cyclohexylamine and 1-aminocyclohexene-2 compounds are similarly prepared.

A mixed organo group polymer is prepared utilizing an equimolar mixture of methyl and butyl amines.

Analogous compounds of all of the above compounds are prepared by replacing the dye with oil orange, para red and martius yellow.

EXAMPLE 3

Poly[(p-phenylazoanilino-methylamino)phosphazene]

A solution of p-phenylazoaniline (0.34 g, 0.0017 mol) and triethylamine (0.9.8 ml) in benzene (50 ml) is allowed to react with poly(dichlorophosphazene) (II) (20 g, 0.17 mol) under a dry nitrogen atmosphere for 35 min. The mixture is then added dropwise to a solution of methylamine (91.8 ml, 2.06 mol) in THF (700 ml) at 0° under a nitrogen atmosphere. A color change from orange-brown to bright yellow occurs at this stage, and a fine precipitate forms. After a further 48 hr. of reaction, first at 0° and later at 25°, the product is isolated and purified by dialysis in water for 5 days. Subsequent precipitation 8 times from methanol into benzene ensures removal of all the non-covalently bound dye. Yield, 4.3 g, 23.4%, X:R, $1:3 \times 10^{-2}$. G.P.C. analysis in methanol or aqueous 95% methanol indicated an $\overline{M}_n$ value near $1.1 \times 10^6$. UV-visible spectroscopy of solutions of 0.0205 g of polymer in 10 ml of aqueous 95% ethanol indicated that (assuming an average chain length of 15,000 repeating units) approximately six dye molecules were attached to each polymer chain. The polymer forms yellow or green, brittle, hydroscopic films that are soluble in water, methanol, or ethanol, but only slightly soluble in isopropanol.

The co-responding ethylamino, propylamino, butylamino and cyclopentylamino compounds are similarly prepared.

The analogous compounds of all of the above are prepared by replacing the dye with celliton orange, celliton violet R, cellitazol ST, yellow AB, sudan violet and chrysaniline.

EXAMPLE 4

Poly[(1-phenylazo-2-naphthylamino-methylamino)-phosphazene]

A solution of 1-phenylazo-2-naphthylamine (0.5 g, $2 \times 10^{-3}$ mol) in diglyme (250 ml) is added slowly over 45 min. to a rapidly stirred solution of poly(dichlorophosphazene) (15.7 g, 0.14 mol) in THF (1500 ml) under a dry, nitrogen atmosphere. After 2 hr. of reaction, the stirred mixture is treated at 0° C. with a large excess of methylamine added as a cooled liquid by means of a dry ice condenser. The reaction temperature is allowed to rise to 25° C. over 4 hrs., and the mixture is then dialyzed to remove hydrochloride salts. The resultant polymer is then isolated by freeze-drying.

The corresponding diethylamino, propylamino and butylamino compounds are similarly prepared except that the polymer is isolated as a film by solution casting.

The analogous compounds of all of the above are prepared by replacing the chromophoric group with the chromophoric group derived from celliton orange, cellitazol ST, yellow AB, brown V, auramine, sudan violet or sudan green.

EXAMPLE 5

Poly[(1-phenylazo-4-p-oxophenylazonaphthalene-ethoxy)phosphazene]

The sodium salt is prepared of 1-phenylazo-4-(p-hydroxyphenylazo)naphthalene (0.25 g, $7.1 \times 10^{-4}$ mol) with excess sodium hydride in a warm benzene-THF mixture. This mixture is then added to a solution of poly(dichlorophosphazene) (15.7 g, 0.14 mol) in a benzene-THF mixture (1500 ml), and reaction is allowed to proceed at 60° C. for 12 hr. To this solution is added an excess of sodium ethoxide, and the mixture is stirred at 25° for 24 hr. The polymer is recovered by precipitation from ethanol into water.

The corresponding compound in which one-half of the ethoxy groups are replaced with methoxy groups are similarly prepared utilizing a 1:1 mixture of sodium methoxide and sodium ethoxide.

EXAMPLE 6

Poly[1-(p-nitrophenoxy)-butylamino)phosphazene]

The sodium salt of p-nitrophenol (0.8 g, $5 \times 10^{-3}$ mol) is prepared by treatment of p-nitrophenol with aqueous sodium hydroxide solution, followed by rigorous drying. A suspension-solution of this material in the THF (200 ml) is added to a stirred solution of poly(dichlorophosphazene) (11.2 g, 0.1 mol) in THF (700 ml). After the mixture has been stirred for 7 hr., an excess of butylamine is added and stirring is continued for 24 hr. The yellow polymer is recovered by precipitation into water.

The analogous methylamino, dimethylamino and σ-toluidino compounds are similarly prepared.

The analogous compound of all of the above are prepared by replacing the chromophoric group with the chromophoric group derived from martius yellow.

EXAMPLE 7

Polypiperidinophosphazene with Chromophore Derived from 1,4-Diaminoanthraquinone A solution-suspension of 1,4-diaminoanthraquinone (0.24 g, $1 \times 10^{-3}$ mol, sudan violet) in THF (300 mol) is added to a stirred solution of poly(dichlorophosphazene) (11.2 g, 0.1 mol) in benzene (600 ml). After 1 hr. of reaction at 50°, the mixture is treated with excess piperidine. The piperidine hydrochloride was filtered off, and the colored polymer was precipitated in ethanol and redissolved in benzene for casting as a film.

The analogous sudan green compound is similarly prepared from the sodium salt of the chromophore.

EXAMPLE 8

Polyphosphazene with Chromophore Derived from Chrysaniline Substituted with Trifluoroethylamino and Triethylamino Groups A solution of 3-amino-9-p-aminophenylacridine (chrysaniline) (0.27 g, $1 \times 10^{-3}$ mol) in a 300 ml of 50:50 mixture of toluene and diglyme is added to a solution of poly(dichlorophosphazene) (15.7 g, 0.14 mol) in 2000 ml of benzene. After stirring for 1 hr. at 25°, the mixture is treated with an excess of a 50:50 mixture of trifluoroethylamine and triethylamine, and stirred at 30° for 24 hr. The small molecule amine hydrochloride salts are filtered off, and the solution is evaporated to form yellow films.

EXAMPLE 9

Poly]bis(methylamino)phosphazene] Salt with Rhodamine B

A solution of poly[bis(methylamino)phosphazene] (1 g) in water (100 ml) is mixed with a solution of 0.2 g of rhodamine B in aqueous alcohol and stirred at 35° C. for two hours. The blue red polymer is solution cast as a film. The strong binding of the dye to the polymer is established by the inability of the dye to be removed by dialysis.

Other salts are similarly formed by replacing the rhodamine B with amido naphthol brown, gallocyanine, chrysamine, direct orange, fast red, metanil yellow, victoria violet, biebrich scarlet or orange R.

The corresponding ethylamino, propylamino, ethoxy and butoxy compounds are similarly prepared by replacement of the starting methylamino polymer with the appropriately substituted compound.

EXAMPLE 10

Poly[bis(phenylamino)phosphazine] Salt with Fast Red

A solution of poly[bis(phenylamino)phosphazene] (1 g) in THF is mixed with a THF solution containing 0.1 g of fast red. The mixture is stirred at 60° C. for three hr., cooled and isolated by precipitation by the addition of water.

EXAMPLE 11

A solution of the product prepared in Example 8 (1 g in 100 ml THF) is mixed with a solution of 0.2 g of rhodamine B in aqueous alcohol and stirred at 40° C. for three hours. The polymer is solution cast as a film.

What is claimed is:

1. A compound selected from the group consisting of those represented by the formulas:

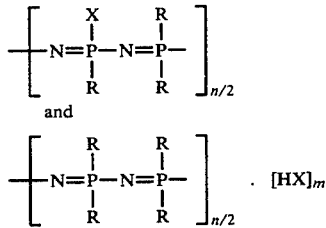

Formula I

Formula II wherein X is a chromophoric group, R is an organo substituent, n is an integer from 250 to 20,000 and m is an integer no larger than n/2; including further compounds wherein the ratio of X to R is from 1:1 to 1:15,000.

2. A compound of claim 1 wherein R is selected from the group consisting of substituted and unsubstituted alkoxy, aryloxy, aralkoxy, alkaryloxy, alkylamino, dialkylamino, arylamino, diarylamino, and alkyl-arylamino.

3. A compound of claim 1, Formula I, wherein X is a chromophoric group selected from the group consisting of those derived from azo, nitro, ketone amine, anthraquinone, acridine, triphenylmethane, oxazine, phthalocyanine, indigoid and sulfur dyes.

4. A compound of claim 1, Formula II, wherein X is a chromophoric group selected from the group consisting of those derived from azo, nitro, ketone amine, anthraquinone, acridine, triphenylmethane, oxazine, phthalocyanine, indigoid and sulfur dyes.

5. A compound of claim 3 wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

6. A compound of claim 4 wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

7. A compound of claim 1 wherein X is a chromophoric group selected from the group consisting of those derived from the azo dyes Celliton yellow, Celliton orange, Golden yellow, Golden orange I, Celliton violet R, Oil orange, Para red, Cellitazol ST, Yellow AB, Brown V and Celliton fast yellow Chrysamine, Benzo fast yellow, Fast red, Methanil yellow, Victoria violet, Biebrich scarlet, and orange R; and wherein R is selected from the group consisting of methoxy, ethoxy, propoxy, butoxy, isobutoxy, phenoxy,trifluoroethoxy, methylamino, ethylamino, propylamino, butylamino, phenylamino and piperidino.

8. A compound of claim 1 wherein X is selected from the group consisting of the nitro dyes Martius yellow, p-nitrophenol and amido naphthol brown; and wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

9. A compound of claim 1 wherein X is auramine and wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

10. A compound of claim 1 wherein X is selected from the group consisting of the anthraquinone dyes sudan violet and sudan green; and wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

11. A compound of claim 1 wherein X is selected from the group consisting of the acridine dyes Chrysaniline and proflavin; and wherein R is selected from the group consisting of methoxy, ethoxy, propoxy, butoxy, isobutoxy, pehnoxy, trifluoroethoxy, methylamino, ethylamino, propylamino, butylamino, phenylamino and piperidino.

12. A compound of claim 1 wherein X is Fuchsine and wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

13. A compound of claim 1 wherein X is selected from the group consisting of Amido naphthol brown and Gallocyanine and wherein R is selected from the group consisting of methoxy, ethoxy, propoxy, butoxy, isobutoxy, phenoxy, trifluoroethoxy, methylamino, ethylamino, propylamino, butylamino, phenylamino and piperidino.

14. Poly[(1-phenylazonaphthaline-2-oxy-trifluoroethoxy)phosphazene].

15. Poly[(1-phenylazonaphthalene-2-oxy-methylamino) phosphazene].

16. Poly[(p-phenylazoanilino-methylamino) phosphazene].

17. Poly[(1-phenylazo-2-naphthylamino-methylamino) phosphazene].

18. Poly[(1-phenylazo-4-p-oxyphenylazonaphthalene-ethoxy) phosphazene].

* * * * *